US010897601B2

(12) United States Patent
Chatterjee et al.

(10) Patent No.: US 10,897,601 B2
(45) Date of Patent: Jan. 19, 2021

(54) DISPLAY PROJECTOR WITH NON-UNIFORM PIXEL RESOLUTION

(71) Applicant: Microsoft Technology Licensing, LLC, Redmond, WA (US)

(72) Inventors: Ishan Chatterjee, Mountain View, CA (US); Bernard Charles Kress, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 16/226,506

(22) Filed: Dec. 19, 2018

(65) Prior Publication Data

US 2020/0204764 A1  Jun. 25, 2020

(51) Int. Cl.
*H04N 9/31* (2006.01)
*G03B 21/20* (2006.01)
*G03B 21/00* (2006.01)
*G02B 26/08* (2006.01)
*G02B 26/10* (2006.01)
*G09G 5/18* (2006.01)

(52) U.S. Cl.
CPC ....... *H04N 9/3108* (2013.01); *G02B 26/0833* (2013.01); *G02B 26/101* (2013.01); *G03B 21/005* (2013.01); *G03B 21/204* (2013.01); *G03B 21/2066* (2013.01); *G09G 5/18* (2013.01)

(58) Field of Classification Search
CPC .. H04N 9/3108; H04N 9/3155; H04N 9/3161; H04N 9/3164; G02B 26/105; G02B 26/0147; G02B 26/101; G02B 26/0816; G03B 21/204; G03B 21/2066
See application file for complete search history.

(56) References Cited

U.S. PATENT DOCUMENTS 7,488,072 B2  2/2009  Perlin et al.
9,488,837 B2  11/2016 Nister et al.
(Continued)

FOREIGN PATENT DOCUMENTS

EP  3179448 A1  6/2017
GB  2498179 A   7/2013
(Continued)

OTHER PUBLICATIONS

"Reflection Technology Private Eye display", Retrieved From: https://artsandculture.google.com/asset/reflection-technology-private-eye-display/QgFnZtDAdVz0CQ, Retrieved on: Dec. 26, 2018, 1 Page.
(Continued)

*Primary Examiner* — William C. Dowling
(74) *Attorney, Agent, or Firm* — Alleman Hall Creasman & Tuttle LLP

(57) ABSTRACT

A display device includes an array of light emitters and a mirror configured to reflect light from the light emitters toward an image plane. The display device further includes a controller configured to control the array of light emitters and the mirror to sweep the mirror through a range of angles, and selectively enable the light emitters during sweeping of the mirror. The selective enablement of light emitters, and the sweeping of the mirror, are configured to cause emitted light from the light emitters to project a plurality of pixels on/toward the image plane, with the pixels being spaced with a non-uniform resolution.

20 Claims, 7 Drawing Sheets

(56) References Cited

U.S. PATENT DOCUMENTS

| | | | |
|---|---|---|---|
| 9,740,282 B1 | 8/2017 | McInerny | |
| 9,986,215 B1 | 5/2018 | Tardif et al. | |
| 10,417,975 B2* | 9/2019 | Tardif | G02B 27/0172 |
| 10,499,021 B2* | 12/2019 | Tardif | H04N 9/3135 |
| 10,602,132 B2* | 3/2020 | Peuhkurinen | G02B 27/0172 |
| 2010/0149073 A1* | 6/2010 | Chaum | G02B 27/0172 |
| | | | 345/8 |
| 2012/0133673 A1 | 5/2012 | Ninan | |
| 2013/0285885 A1 | 10/2013 | Nowatzyk et al. | |
| 2016/0307482 A1 | 10/2016 | Huang et al. | |
| 2018/0136471 A1 | 5/2018 | Miller et al. | |
| 2020/0082794 A1* | 3/2020 | Sanders | G06F 3/013 |

FOREIGN PATENT DOCUMENTS

| | | |
|---|---|---|
| JP | 2001117505 A | 4/2001 |
| WO | 2017094002 A1 | 6/2017 |

OTHER PUBLICATIONS

"Virtual Boy", Retrieved From: https://en.wikipedia.org/wiki/Virtual_Boy, Retrieved on: Dec. 26, 2018, 11 Pages.

Bastani, et al., "Introducing a New Foveation Pipeline for Virtual/Mixed Reality", Retrieved From: https://ai.googleblog.com/2017/12/introducing-new-foveation-pipeline-for.html, Dec. 5, 2017, 7 Pages.

Izadi, et al., "Going Beyond the Display: A Surface Technology with an Electronically Switchable Diffuser", in Proceedings of the 21st annual ACM symposium on User interface software and technology, Oct. 19, 2008, pp. 269-278.

Tardif, et al., "Foveated MEMs Scanning Display", Application as Filed in PCT Application No. PCT/US18/025616, Filed Date: Apr. 2, 2018, 32 Pages.

"International Search Report and Written Opinion Issued in PCT Application No. PCT/US19/065830", dated Apr. 29, 2020, 20 Pages.

* cited by examiner

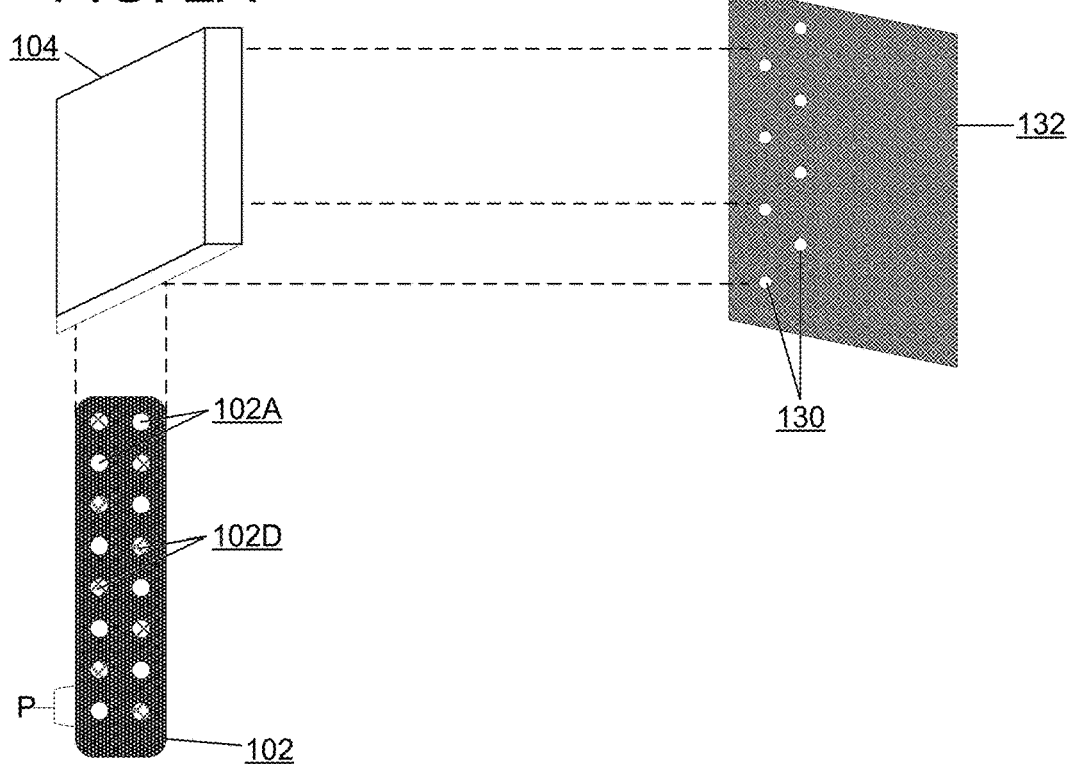
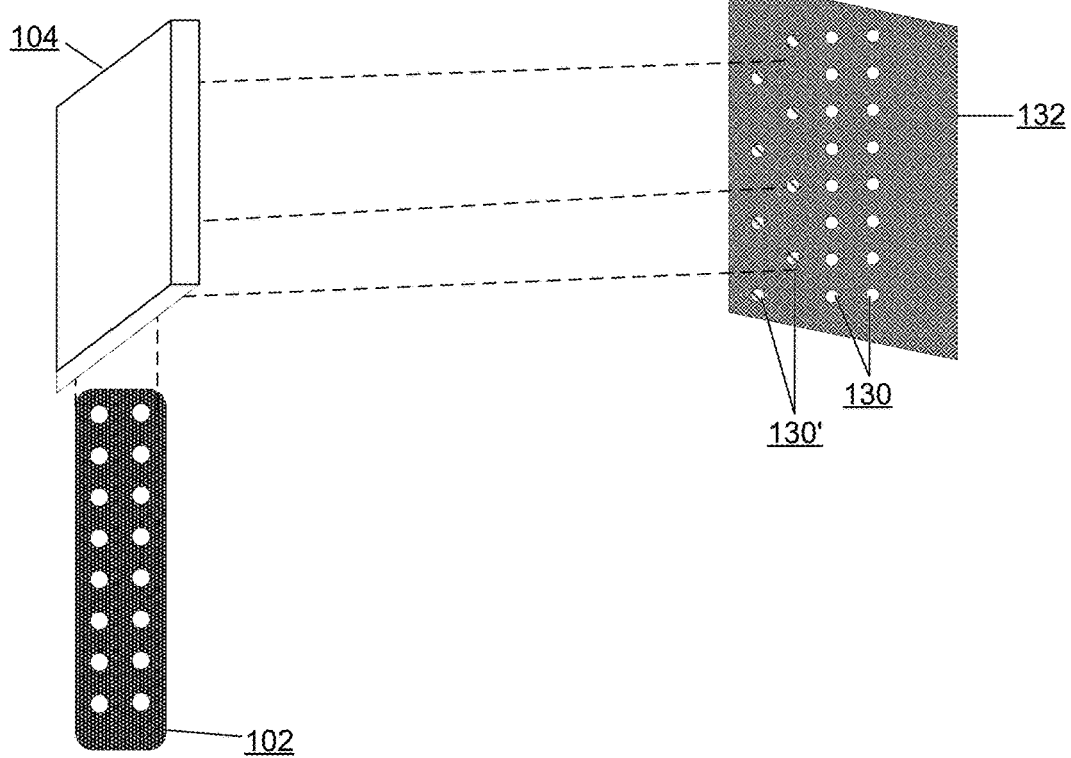

DISPLAY PROJECTOR WITH NON-UNIFORM PIXEL RESOLUTION

BACKGROUND

Very small moving mirrors can be used to create high-resolution displays, in which the mirrors reflect light from light emitters (e.g., MicroLEDs) to project the light onto a surface to form a rasterized image having a uniform spatial resolution. Moving the mirror and enabling light emitters to generate the pixels consumes energy and computer processing resources. Such consumption typically increases with increased spatial resolution of the pixelated image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A display device includes an array of light emitters and a mirror configured to reflect light from the light emitters toward an image plane. The display device further includes a controller configured to control the array of light emitters and the mirror to sweep the mirror through a range of angles, and selectively enable the light emitters during sweeping of the mirror. The selective enablement of light emitters, and the sweeping of the mirror, are configured to cause emitted light from the light emitters to project a plurality of pixels on/toward the image plane, with the pixels being spaced with a non-uniform resolution across all or a section of the image.

BRIEF DESCRIPTION OF THE DRAWINGS

FIGS. 2A-2B show an exemplary display device including an array of light emitters and a mirror configured to reflect light from the light emitters toward an image plane.

DETAILED DESCRIPTION

Figure 1:
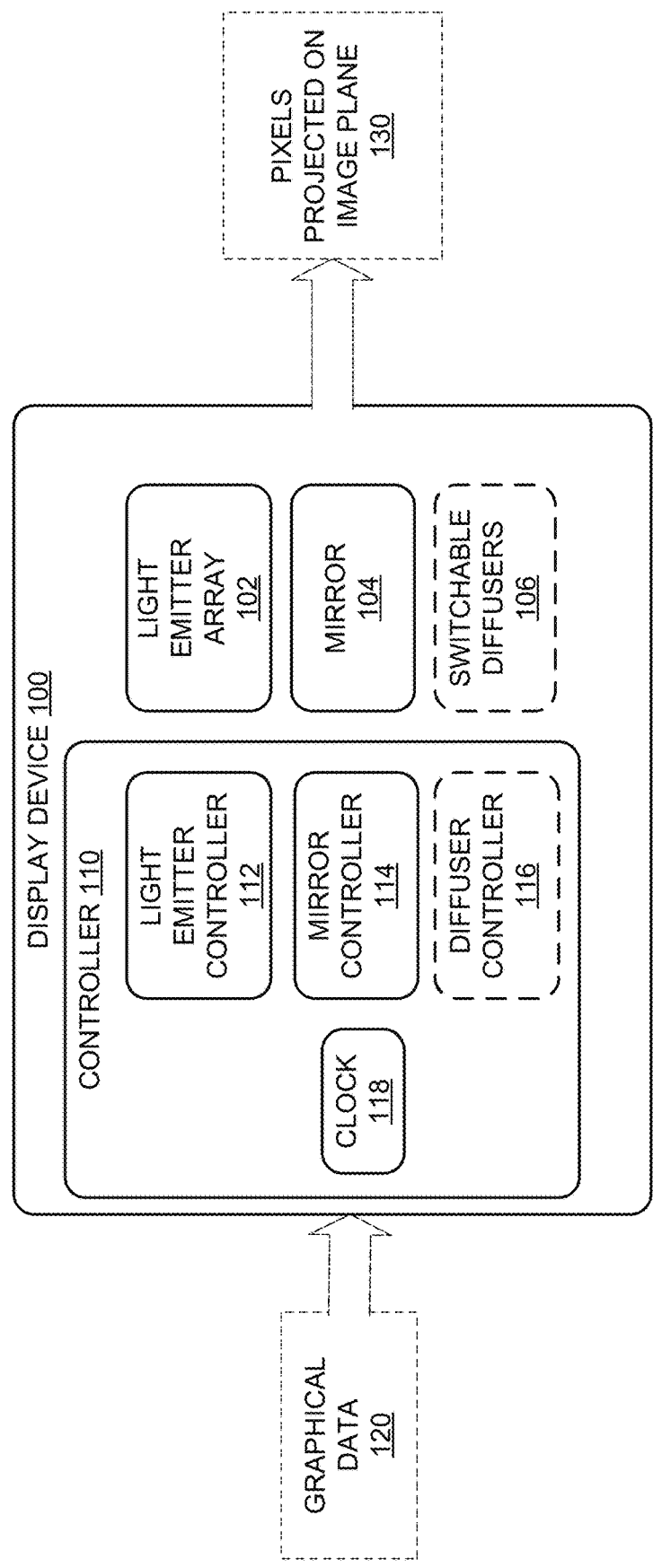
FIG. 1 shows an exemplary schematic for a display device.

Typical displays cause a collection of uniformly-spaced pixels to be projected towards an image plane (e.g., onto a display surface) for viewing. However, human vision does not have uniform perceptual resolution. Instead, human vision includes a high-resolution foveal region with significantly lower resolution perception outside of the foveal region. Accordingly, when a human viewer uses a typical display, a large number of the uniformly-spaced pixels projected by the display may be "wasted" in the sense that they are in the peripheral region of the human field of view and cannot be perceived at the full resolution at which they are displayed. Accordingly, displays with non-uniform pixel spacing may reduce power and/or computational cost by displaying fewer pixels in the peripheral region of human vision, without impacting visual quality for a human viewer. The present description is directed to creating, in mirror-swept microLED and other emitter displays, a non-uniform display Accordingly, FIG. 1 shows a schematic view of an exemplary display device 100 configured to emit light to project a plurality of pixels 130 on an image plane with non-uniform spacing between pixels (i.e., a non-uniform resolution). In some examples, the pixels 130 may be based on graphical data 120 received at the display device 100 (e.g., pixels 130 may be rendered based on 2D or 3D raster graphics data, vector graphics data, etc.). Pixels 130 may form a 2D image at the image plane. Display device 100 is configured to project the pixels 130 with a non-uniform spatial distribution (e.g., in order to project an image having a non-uniform image resolution).

Display device 100 includes an array of light emitters 102. Array of light emitters 102 may include any suitable light emitting devices, e.g., light emitting diodes (LED), micro LED, organic LED, lasers, laser diodes, etc. Array of light emitters 102 may include any suitable number of white and/or color LEDs, e.g., a plurality of red, green, and blue LEDs.

Display device 100 further includes a mirror 104. Mirror 104 is configured to reflect light from the light emitters towards an image plane. The image plane may be any plane or other shape/surface towards which light from the light emitters is directed. In some examples, the image plane may be a physical surface on which to project pixels to form an image. For example, the image plane may be a flat reflective screen, a human eye, a light guide (e.g., a surface relief grating optic), or any other suitable surface for projecting the projected pixels. In some examples, the image plane may be curved (e.g., a curved reflective screen for OMNIMAX™ projection). In some examples, the image plane may not correspond to a particular physical surface. For example, the image plane may include a region of three-dimensional space (e.g., a planar region, curved region such as a spherical shell, etc.) towards which light is directed, an aperture or other optical elements through which light is directed, etc. In many of the examples herein, the image plane will be discussed as an actual surface onto which pixels can be projected. It will be appreciated, however, that the image plane may also be a non-surface area, such as an aperture of an optical component.

In some examples, display device 100 may further include additional mirrors and/or relay optics, such as, but not limited to, lenses, polarizers, beam splitters, disposed in a light path between array of light emitters 102 and the image plane, e.g., additional mirrors between light emitters 102 and mirror 104 and/or additional mirrors between mirror 104 and the image plane. Mirror 104 is configured to be rotated into different projection angles determining a projection location of projected pixels. For example, mirror 104 may be rotated along a single rotational axis to sweep projected pixels across the image plane. Mirror 104 may additionally be rotated along additional rotational axes, and/or employed along with additional mirrors configured to further reflect projected pixels after reflection by mirror 104, and further control projected location of projected pixels.

Optionally, in some examples, display device 100 further includes one or more fixed or switchable diffusers 106. Switchable diffusers 106 may be disposed in the light path between array of light emitters 102 and mirror 104. Switchable diffusers 106 may be switched "on" or "off" and, when switched "on" are configured to diffuse light traveling from one or more light emitters 102 and mirror 104. Such diffusion of light may be used to increase the effective size of a projected pixel by diffusing light from a light emitter so that the diffused light spreads to project towards a relatively larger area of the image plane, thereby resulting in an enlarged pixel projected towards the image plane. Switchable diffusers 106 may be based on any suitable technology for modulating an amount of diffusion of light in the light path, e.g., based on liquid crystal (LC) technologies for modulating an amount of diffusion based on a phase state of a liquid crystal. In some examples, a switchable diffuser may include a stack of one or more switchable layers arranged in a serial fashion, so that different combinations of switchable layers may be switched on to achieve different levels of diffusion, thereby achieving different sizes of enlarged pixels at the image plane.

Display device 100 further includes a controller 110 configured to control the array of light emitters and the mirror. Controller 110 may include one or more subcomponents, for example, a clock configured to generate timing information for a light emitter controller 112 to control light emitter array 102, a mirror controller 114 for controlling projection angle for mirror 104, and optionally, a diffuser controller 116 for controlling switchable diffusers 106. Controller 110 may contain additional logic devices, storage devices, communication devices, etc., configured to coordinate the projection of pixels towards the image plane. For example, controller 110 may be configured to receive graphical data 120, process the graphical data 120, and based on such processing, control the light emitter array 102, the mirror 104, and optionally the switchable diffusers 106 to cause display device 100 to emit a plurality of pixels 130 which are projected towards the image plane.

FIG. 2A shows a simplified schematic depiction of a light path in a display device 100 from a light emitter array 102 to an adjustable mirror 104 and towards an image plane 132. As shown, the array of light emitters 102 includes two columns of light emitters with light emitters arranged with a spacing within each column defined by a pitch value P. Although the array of light emitters 102 is shown with two columns of monochromatic light emitters, display device 100 may alternately include an array of light emitters with any number of differently colored light emitters in any suitable arrangement (e.g., columns of blue, red, and green light emitters).

Light emitter controller 112 is configured to selectively enable/disable light emitters in light emitter array 102. For example, as shown in FIG. 2A, half of the light emitters are activated light emitters 102A (shown in white), while the other half are deactivated light emitters 102D (shown with cross-hatch shading). The light from the activated light emitters 102A is reflected on mirror 104 to image plane 132, to form projected pixels 130. Accordingly, projected pixels 130 are projected in the same pattern as the activated light emitters 102A.

Mirror controller 114 is configured to cause mirror 104 to be oriented in different projection angles for selectively redirecting light from light emitter array 102. For example, mirror controller 114 may include a micro-electrical mechanical systems (MEMS) mirror actuator which is addressable to set mirror 104 to one of a plurality of discrete projection angles. Mirror controller 114 and mirror 104 may be finely adjustable to redirect light from light emitter array 102 to a large number of distinct locations on an image plane, e.g., hundreds, thousands or more different locations.

Mirror controller 114 may cause mirror 104 to sweep from an initial angle as shown in FIG. 2A to a subsequent angle as shown in FIG. 2B. Accordingly, the projected pixels 130 on image plane 132 are at a different location on image plane 132 based on the angle of the mirror 104.

Light emitter controller 112 may selectively enable different light emitters in light emitter array 102, e.g., to enable all of the light emitters as shown in FIG. 2B. Accordingly, each light emitter results in a projected pixel among the projected pixels 130 on the image plane.

As the mirror 104 is swept and lights in the light emitter array 102 are selectively enabled and disabled, pixels 130 on the image plane 132 are projected in different locations and activation patterns. In some situations, previously-displayed pixels that were projected at the image plane 132 within a short duration may be considered in aggregate to form an image. For example, human visual systems, machine-learning visual systems, camera sensors, and other visual systems may integrate visual stimuli across a short time, so that visual stimuli that are projected in close temporal succession may be perceived as unified stimuli. Accordingly, for such visual systems, previously-displayed pixels 130' (shown with diagonal shading) may be visible for a short time even the mirror 104 is moved and different pixels are selectively enabled (e.g., causing previously-displayed pixels 130' to no longer be projected at the image plane 132 and causing new pixels 130 to be projected at the image plane 132).

By sweeping the mirror 104 while selectively enabling light emitters in the array 102, display device 100 may display a succession of bands of pixels (e.g., pixels 130' and 130 as shown in FIG. 2B), thereby forming an image that may be perceived as an aggregate of the succession of bands.

FIGS. 2C-2F show further examples of activation patterns for array of light emitters 102, and resulting projected pixels at image plane 132 as the mirror is swept through a range of different angles. As in FIG. 2A-2B, the most recent pixels being projected are shown in white, whereas the previously-projected pixels are shown with diagonal shading.

Figure 2C:
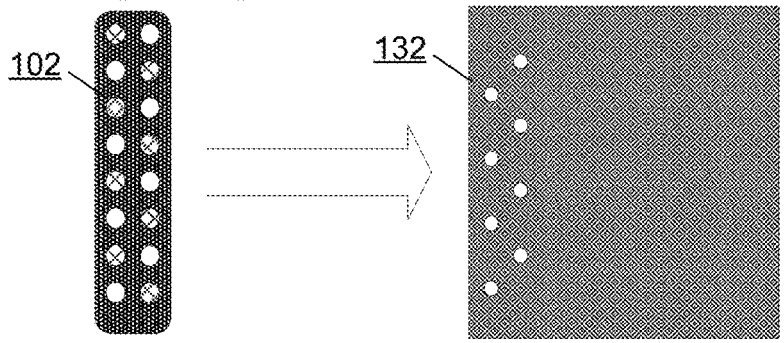
FIG. 2C-2F show a succession of activation patterns for a light emitter array, and corresponding projected pixels on an image plane.
Figure 2D:
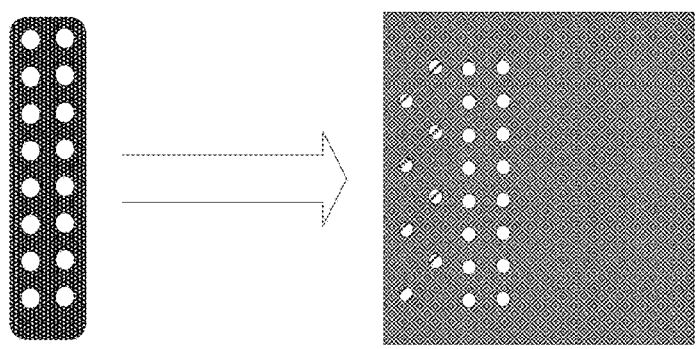
Figure 2E:
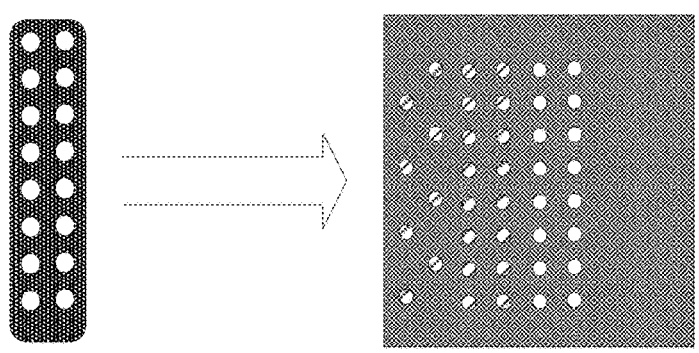
Figure 2F:
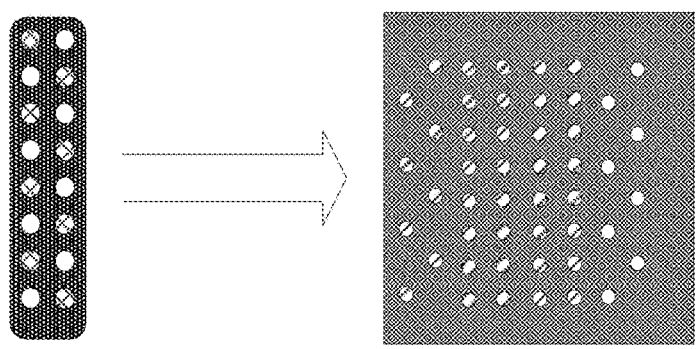

As shown in FIGS. 2D-2F, the selective enablement of the light emitters and sweeping of the mirror is configured to project a plurality of pixels that may be spaced with a non-uniform resolution. For example, the pixels projected at the times shown in FIGS. 2C and 2F are spaced out in a checkerboard pattern (e.g., with half the spatial frequency of pixels that could potentially be enabled), whereas the pixels drawn in 2D and 2E are drawn with full resolution (e.g., with all of the potential pixels enabled). Various non-uniform resolutions may be achieved by the display device 100 (e.g., based on graphical data 120). To achieve non-uniform resolutions, the selective enablement of light emitters includes selectively enabling a higher proportion of light emitters to achieve a higher resolution, and selectively enabling a lower proportion of light emitters to achieve a lower resolution.

Figure 3A:
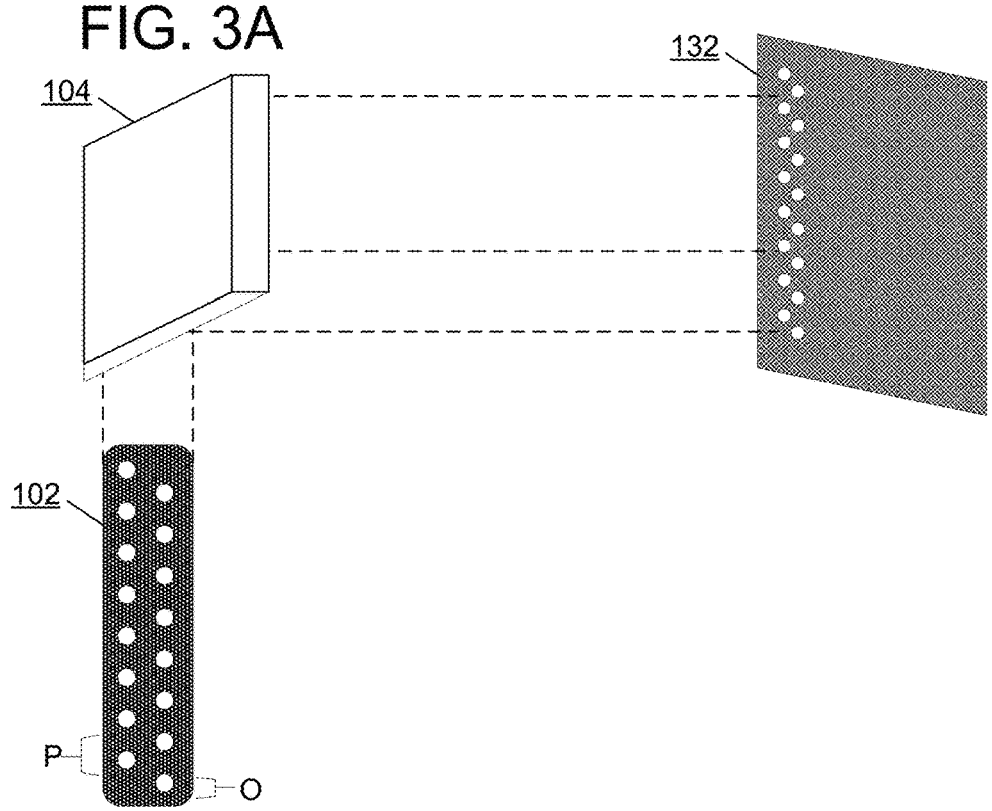
FIGS. 3A-3B show an exemplary display controller with an array of light emitters having columns of light emitters arranged at an offset smaller than a light emitter pitch within the columns.
Figure 3B:
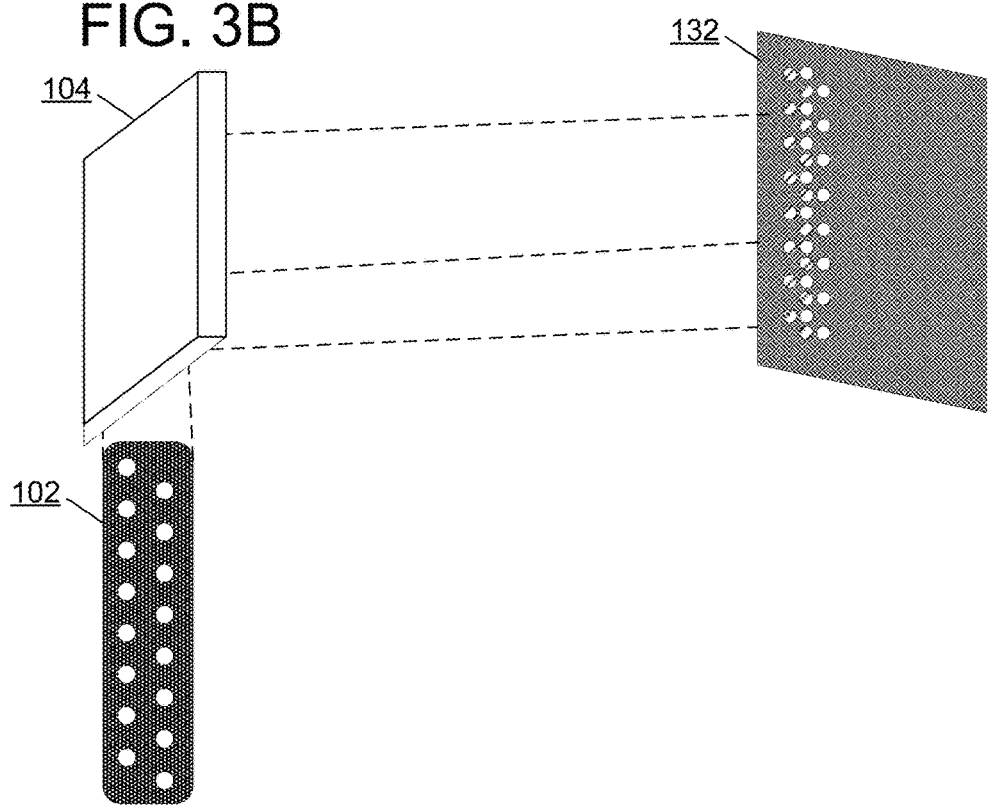

FIG. 3A-3B show an alternate arrangement of light emitters in light emitter array 102, in which the light emitters within a first column are arranged at an offset relative to the light emitters within a second column, and the offset is defined by an offset value O which is less than the pitch value P. In some examples, the offset value is less than half the pitch value.

As shown in FIGS. 3A and 3B, the mirror may be swept to display a vertical slice of pixels including pixels generated by light emitted by the light emitters that were selectively enabled in the first column and the second column, across two successive time steps. The sweeping of the mirror and the offset arrangement of the first column and the second column increases an effective resolution of pixels within the vertical slice. As shown in the previously-displayed pixels and projected pixels on image plane 132 in FIG. 3B, the mirror may be swept by a small angle to increase an effective vertical and horizontal resolution of pixels (e.g., relative to the arrangement shown in FIGS. 2A-2B). In particular, as shown, the mirror is swept so that the pixels resulting from the first column of light emitters in array 102 are interleaved with the pixels resulting from the second column of light emitters at successive time steps, as shown in FIG. 3B. Accordingly, the pixels may be tightly packed to achieve a higher effective resolution (e.g., roughly double the resolution achieved when using all of the light emitters to project pixels in FIGS. 2B, 2D, and 2E).

Figure 4A:
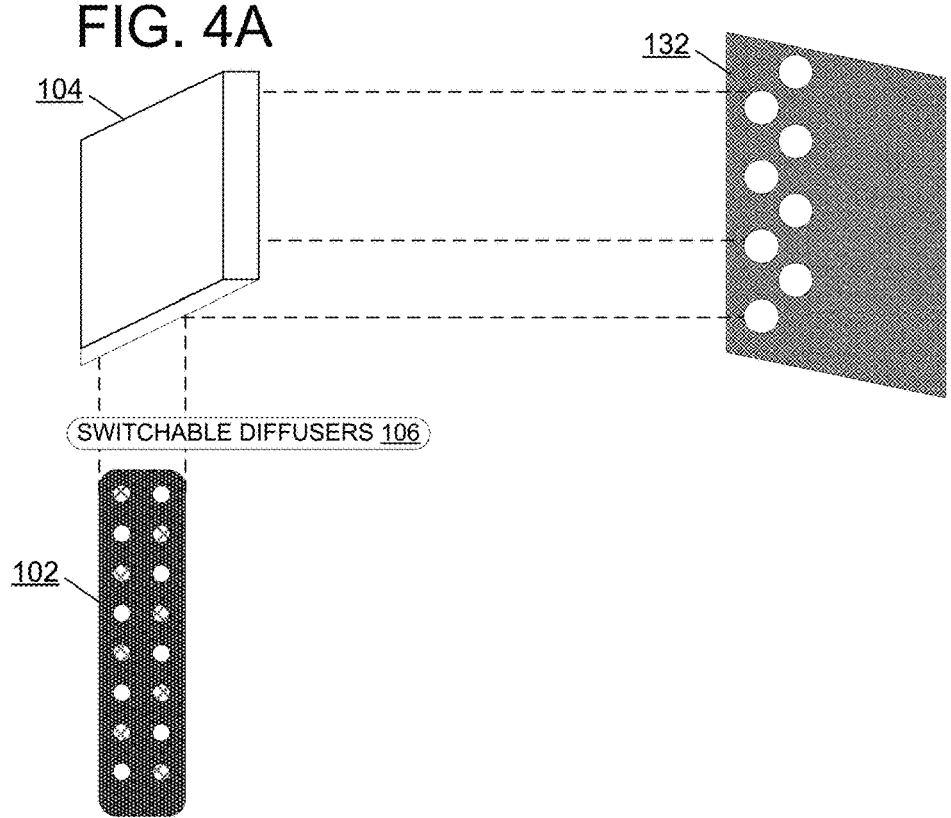
FIGS. 4A-4B show an exemplary display controller with a switchable diffuser configured to enlarge projected pixels.
Figure 4B:
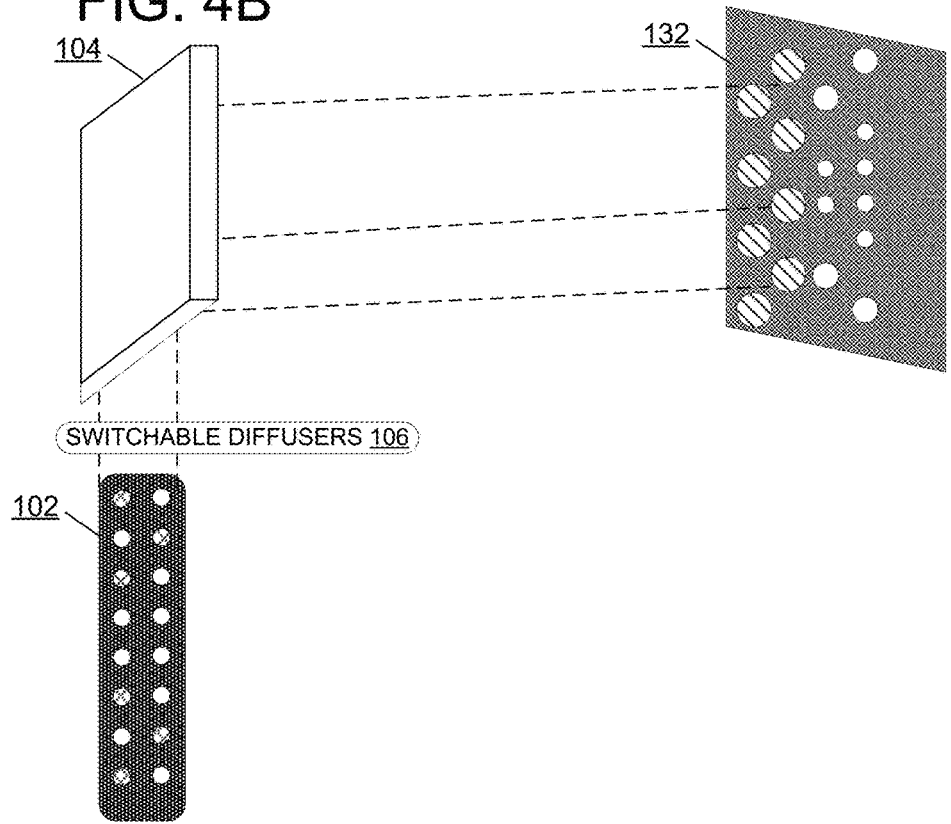

FIG. 4A-4B depict a display device that includes one or more switchable diffusers 106. Each switchable diffuser is configured to cause emitted light from a light emitter to be diffused to result in an enlarged pixel projected on the image plane 132. As described above, switchable diffusers may include a stack of switchable diffuser layers which can be individually enabled in different combinations to achieve different levels of diffusion for light emitted by each light emitter (e.g., turning on more diffuser layers to achieve a higher level of diffusion). As shown in FIG. 4A, the switchable diffusers are all turned "on" at a highest level of diffusion to spread light and thereby enlarge projected pixels. As shown in FIG. 4B, the switchable diffusers are selectively turned "on" at an intermediate level of diffusion for light emitters at the tops and bottoms of the columns in the array 102, and turned "off" in the middle of the columns, to enlarge only some of the projected pixels at image plane 132. Due to the intermediate level of diffusion, the enlarged pixels at the top and bottoms of the columns are of an intermediate size compared to the non-enlarged pixels at the center of the columns, and the larger pixels previously drawn in FIG. 4A. In some examples, the controller is configured to selectively switch the one or more switchable diffusers to selectively enlarge pixels in regions of pixels spaced with a relatively lower resolution (e.g., the top and bottom area of columns in FIG. 4B).

Figure 5A:
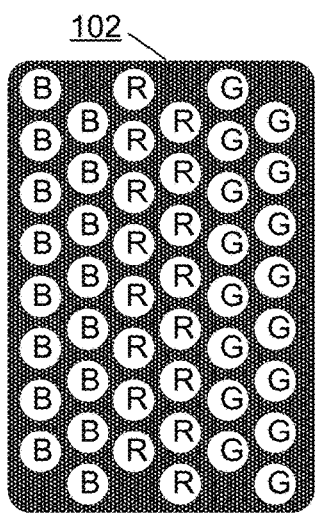
FIG. 5A shows an exemplary multi-color light emitter array.

FIG. 5A depicts an alternative arrangement for light emitters in a light emitter array 102, with light emitters explicitly labelled as blue (B), red (R), or green (G) light emitters. The light emitters are arranged with an offset arrangement similar to the arrangement depicted in FIG. 3A, with three sets of two columns (for each color). Although not shown in FIG. 5A, any suitable number of blue/red/green light emitters may be arranged in any other suitable fashion (e.g., columns of blue/red/green light emitters interleaved in a different fashion than shown in FIG. 5A, blue/red/green light emitters interspersed within columns, etc.).

Figure 5B:
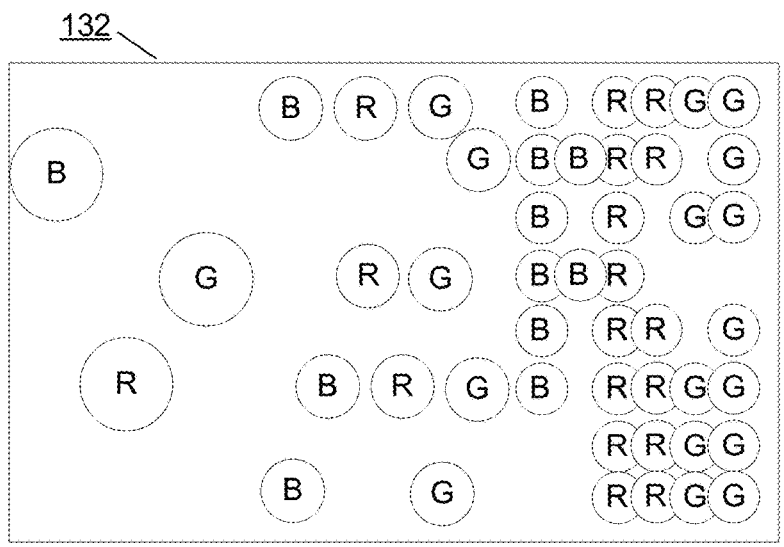
FIG. 5B shows a non-uniform spacing of pixels projected by a display device.

FIG. 5B shows a potential non-uniform spacing of pixels projected to an image plane 132 (e.g., due to light emitted by light emitters in a multi-color array 102 as shown in FIG. 5A). As shown, the pixels are distributed with a non-uniform spacing including a high resolution area with small pixels resulting from low or no application of diffusion from switchable diffusers, an intermediate resolution area with intermediate-sized pixels resulting from an intermediate application of diffusion from switchable diffusers, and a low-resolution area with larger pixels resulting from applying a higher amount of diffusion. As shown, at the right side of FIG. 5B, pixels are projected with a lowest resolution and a largest pixel size (e.g., by selectively enabling relatively few light emitters and enabling one or more switchable diffusers in the light path for the enabled light emitters). As shown, at the middle area of FIG. 5B, pixels are projected with a higher resolution and a smaller pixel size (e.g., by selectively enabling relatively more light emitters and selectively enabling fewer layers of switchable diffusers). As shown, at the right area of FIG. 5B, pixels are projected with a still higher resolution and a still smaller pixel size (e.g., by enabling fewer or even no switchable diffusers, by selectively enabling more light emitters, and by sweeping the mirror at a small angle as shown in FIG. 2A-2B to interleave successive vertical strips of pixels to increase the effective horizontal and vertical resolution).

Figure 5C:
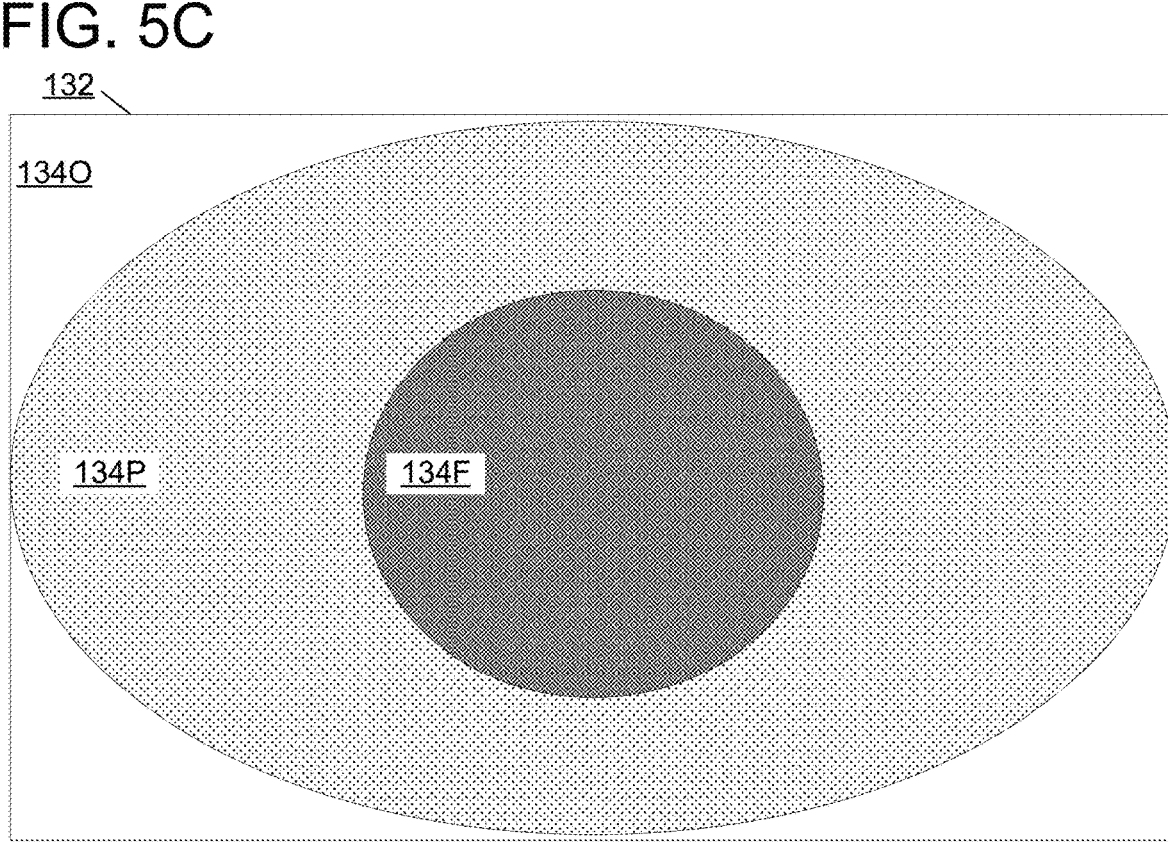
FIG. 5C shows a non-uniform spacing of pixels divided into foveal and peripheral regions.

In some examples, as shown in FIG. 5C, due to the selective enablement of the light emitters, a foveal region 134F of the image plane 132 has a higher resolution than a periphery region 134P of the image plane. In some examples, the foveal region may be determined by tracking the pose of an eye of a human viewer (e.g., to locate the fovea). In other examples, the foveal region may be predetermined so that a particular area of an image is rendered at a higher resolution. In some examples, a foveal region may be determined based on projected content. For example, in a video game, content of interest to a human player may mostly occur towards the center of the image plane. Accordingly, the center of the image plane may be treated as a fovea region and displayed in higher resolution, irrespective of the eye pose of the human player. Accordingly, the selective enablement of light emitters includes selectively enabling a higher proportion of light emitters to achieve a higher resolution in the foveal region 134F, and selectively enabling a lower proportion of light emitters to achieve a lower resolution in the periphery region 134P. Resolution in the periphery may be selected based on empirical models of human vision. It is believed that resolution in the periphery may be relatively low compared to resolution in the fovea without loss of perceived quality, e.g., one half, one quarter, one tenth, or an even smaller factor of the resolution in the foveal region. In some examples, the foveal region is defined by tracking an eye of a human viewer. Accordingly, based on the tracked eye pose of the human viewer, the foveal region can be drawn at a high resolution while drawing the periphery at a lower resolution.

As shown in FIG. 5C, in some examples, the pixels may be arranged within an elliptical region of the image plane 132 having a periphery region 134P and foveal region 134F and omitting an outside region 134O. In some examples, the elliptical region is defined by tracking an eye of a human viewer (e.g., so that pixels can be projected to the full elliptical field of view of the human viewer without projecting pixels to the outside region 134O that are outside of the field of view of the human viewer). Alternately, the pixels may be arranged in any other shaped region (e.g., rectangular or polygonal regions). Accordingly, the selective enablement of light emitters includes selectively enabling light emitters based on whether light from the light emitters would fall within the elliptical region at a current mirror angle.

In some examples, eye tracking can be omitted and the elliptical display region, peripheral region and foveal region can be fixed. For example, when a display is close to the human eye (e.g., head-mounted display), if a human viewer directs an eye towards the edge of view, the human viewer will reflexively move their head instead of their eye at a threshold viewing angle, so that the total field of view of the human viewer is constrained to a fixed angular size (e.g., 210 degrees). Accordingly, a display region of a corresponding size may be drawn at a fixed position with a relatively large fovea region that encompasses all of the angular space visible to the human fovea at different eye angles. In this fashion, even as the human viewer changes their eye angle, their fovea will be within the high-resolution region. Accordingly, the techniques of the present disclosure may be used to provide high-quality near-eye visuals without a need to perform any eye tracking.

Whether or not eye tracking is performed, the foveal region and elliptical region can occupy any portion of the image plane. For example, when pixels are projected into the eye of a human viewer, the foveal region can be defined based on typical human fovea size. For example, a typical human fovea may be an approximately 1-2 mm diameter region. For other display surfaces, foveal region area can be defined based on a portion of surface that human fovea can see at one time. Similarly, an elliptical display region can be defined based on human field of view, e.g., an ellipse spanning 210 horizontal degrees to fully cover the visual field, or an ellipse spanning a narrower range to cover the binocular region of highest acuity.

In some examples, the controller is configured to sweep the mirror in a sawtooth pattern, e.g., a pattern in which mirror is driven from a first extreme angular position to a second extreme angular position at a first speed, then reset from the second extreme angular position to the first extreme angular position at a second speed exceeding the first speed. For example, the sawtooth pattern may have a plurality of smaller angular steps as the mirror is moved from the first extreme angle to the second extreme angle, separated by larger reset steps when the mirror is moved back from the second extreme angle to the first extreme angle. Alternately, the mirror may be driven with smooth linear motion from the first extreme angle to the second extreme angle, then reset quickly from the second extreme angle to the first extreme angle. For example, the controller may be configured to draw a succession of vertical lines by sweeping the mirror to draw vertical lines at a leftmost position and sweep towards a rightmost position (in a series of smaller angular steps), then reset the mirror to draw a subsequent succession of vertical lines from left-to-right, again starting at the leftmost position.

Alternately, the controller may be configured to drive the mirror in a sinusoidal pattern (e.g., to sweep the mirror back and forth, driving the mirror at a high speed and taking advantage of harmonic motion of mirror to increase speed and/or decrease power consumption), or in any other suitable repeating pattern.

In some examples, the selective enablement of light emitters includes toggling the light emitters between an on state and an off state according to a duty cycle for each light emitter and based on timing information from a clock of the controller. The duty cycle may be varied to achieve the non-uniform resolution, e.g., each light emitter may have a variable allocation of on and off periods in the duty cycle that is changed as different portions of pixels are drawn to the image plane. For example, as the mirror is swept to different angles, at each angle, a corresponding portion of vertical band of pixels may be drawn by selectively enabling appropriate light emitters, which may remain enabled until the mirror is in the next angular step and the next set of light emitters is selectively enabled. Alternately or additionally, in some examples, a duration of pulsing a light emitter is less than a scheduled duration between pulses for the light emitter, so that light emitters are briefly pulsed at each angular step configuration of the mirror, then turned off before the next selection of light emitters is briefly pulsed again when the next angular step of the mirror occurs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
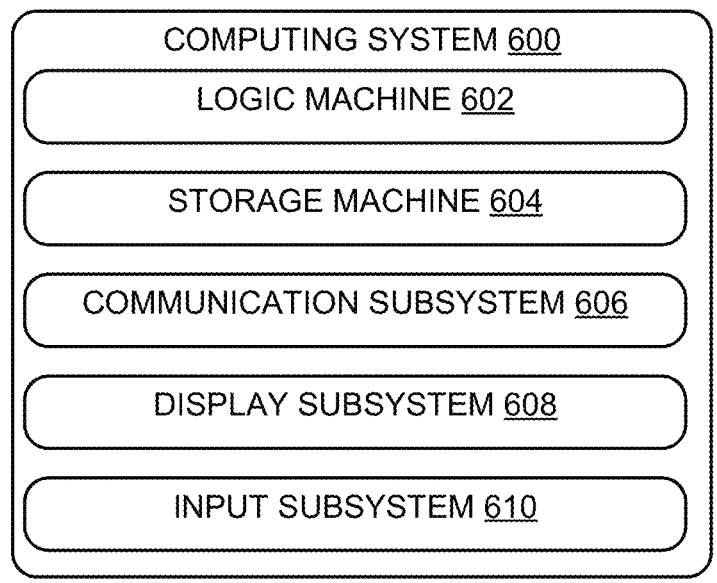
FIG. 6 shows an exemplary computer system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 608, input subsystem 610, communication subsystem 606, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

Display subsystem 608 may include a display controller 100 as shown in FIG. 1. Display subsystem 608 may be used to present a visual representation of data held by storage machine 604. This visual representation may take the form of a graphical user interface (GUI). As the herein described methods and processes change the data held by the storage machine, and thus transform the state of the storage machine, the state of display subsystem 608 may likewise be transformed to visually represent changes in the underlying data. Alternately or in addition to a display device 100, display subsystem 608 may include one or more display devices utilizing virtually any type of technology. Display devices such as display device 100 or any other display device may be combined with logic machine 603 and/or storage machine 604 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 606 may be configured to communicatively couple computing system 600 with one or more other computing devices. Communication subsystem 606 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, a display device comprises: an array of light emitters; a mirror configured to reflect light from the light emitters towards an image plane; and a controller configured to control the light emitters and the mirror to: sweep the mirror through a range of angles, and selectively enable the light emitters during sweeping of the mirror, such selective enablement and sweeping configured to cause emitted light from the light emitters to project a plurality of pixels on the image plane, the plurality of pixels spaced with a non-uniform resolution. In this or any other example, the array of light emitters includes two or more columns of light emitters with light emitters in each column arranged with a spacing defined by a pitch value; and the light emitters within a first column are arranged at an offset relative to the light emitters within a second column, the offset defined by an offset value less than the pitch value. In this or any other example, the offset value is less than half the pitch value. In this or any other example, the mirror is swept to display a vertical slice of pixels including pixels projected from light generated by emitters that were selectively enabled in the first column and the second column, wherein the sweeping of the mirror and the offset arrangement of the first column and the second column increases an effective resolution of pixels within the vertical slice. In this or any other example, due to the selective enablement of the light emitters, a foveal region of the image plane has a higher resolution than a periphery region of the image plane. In this or any other example, the foveal region is defined by tracking an eye of a human viewer. In this or any other example, the plurality of pixels are arranged within an elliptical region of the image plane. In this or any other example, the selective enablement includes selectively enabling light emitters based on whether light from the light emitters would fall within the elliptical region at a current mirror angle. In this or any other example, the selective enablement of light emitters includes selectively enabling a higher proportion of light emitters to achieve a higher resolution, and selectively enabling a lower proportion of light emitters to achieve a lower resolution. In this or any other example, the display device further comprises one or more fixed or switchable diffusers, each switchable diffuser configured to cause emitted light from a light emitter to be diffused to result in an enlarged pixel projected on the image plane. In this or any other example, the controller is configured to selectively switch the one or more switchable diffusers to selectively enlarge pixels in regions of pixels spaced with a relatively lower resolution. In this or any other example, the controller is configured to sweep the mirror in a sawtooth pattern so that the mirror is driven from a first extreme angular position to a second extreme angular position at a first speed, then reset from the second extreme angular position to the first extreme angular position at a second speed exceeding the first speed. In this or any other example, the array of light emitters includes a column of red light emitters, a column of green light emitters, and a column of blue light emitters. In this or any other example, the selective enablement of light emitters includes toggling the light emitters between an on state and an off state according to a duty cycle for each light emitter and timing information from a clock of the controller, wherein the duty cycle for each light emitter is varied to achieve the non-uniform resolution.

In an example, a method of controlling an array of light emitters and a mirror configured to reflect light from the light emitters towards an image plane comprises: sweeping the mirror through a range of angles, selectively enabling one or more of the light emitters, such selective enablement configured to cause emitted light from the light emitters to project a plurality of pixels on the image plane, the plurality of pixels spaced with a non-uniform resolution. In this or any other example, the method further comprises controlling one or more switchable diffusers, each switchable diffuser configured to cause emitted light from a light emitter to be diffracted to result in an enlarged pixel projected on the image plane. In this or any other example, the method further comprises controlling the one or more switchable diffusers includes switching the one or more switchable diffusers to selectively enlarge pixels in regions of pixels spaced with a relatively lower resolution. In this or any other example, the array of light emitters includes two or more columns with light emitters arranged with a spacing within each column defined by a pitch value; the light emitters within a first column are arranged at an offset relative to the light emitters within a second column, the offset defined by an offset value less than the pitch value; and the mirror is swept to display a vertical slice of pixels including pixels projected from light generated by emitters that were selectively enabled in the first column and the second column, wherein the offset arrangement of the first column and the second column increases an effective resolution of pixels within the vertical slice. In this or any other example, the method further comprises tracking an eye of a human viewer; and based on a tracked pose of the eye of the human viewer, displaying the plurality of pixels with a non-uniform resolution including a foveal region having a higher resolution and a periphery region having a lower resolution.

In an example, a display device comprises: an array of light emitters; a mirror configured to reflect light from the light emitters towards an image plane; one or more switchable diffusers, each switchable diffuser configured to cause emitted light from a light emitter to be diffracted to result in an enlarged pixel projected on the image plane; and a controller configured to control the array of light emitters and the mirror to: sweep the mirror through a range of angles, selectively enable one or more of the light emitters, such selective enablement configured to cause emitted light from the light emitters to project a plurality of pixels on the image plane, the plurality of pixels spaced with a non-uniform resolution, and selectively switch the one or more switchable diffusers to selectively enlarge pixels in regions of pixels spaced with a relatively lower resolution.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
an array of light emitters;
a mirror configured to reflect light from the light emitters towards an image plane; and
a controller configured to control the light emitters and the mirror to:
sweep the mirror through a range of angles, and
selectively enable the light emitters during sweeping of the mirror, such selective enablement and sweeping configured to cause emitted light from the light emitters to project a plurality of pixels on the image plane, the plurality of pixels spaced with a non-uniform resolution, wherein the selective enablement of light emitters includes toggling the light emitters between an on state and an off state according to a duty cycle for each light emitter and timing information from a clock of the controller, wherein the duty cycle for each light emitter is varied to achieve the non-uniform resolution.

2. The display device of claim 1, wherein:
the array of light emitters includes two or more columns of light emitters with light emitters in each column arranged with a spacing defined by a pitch value; and
the light emitters within a first column are arranged at an offset relative to the light emitters within a second column, the offset defined by an offset value less than the pitch value.

3. The display device of claim 2, wherein the offset value is less than half the pitch value.

4. The display device of claim 2, wherein the mirror is swept to display a vertical slice of pixels including pixels projected from light generated by emitters that were selectively enabled in the first column and the second column, wherein the sweeping of the mirror and the offset arrangement of the first column and the second column increases an effective resolution of pixels within the vertical slice.

5. The display device of claim 1, wherein due to the selective enablement of the light emitters, a foveal region of the image plane has a higher resolution than a periphery region of the image plane.

6. The display device of claim 5, wherein the foveal region is defined by tracking an eye of a human viewer.

7. The display device of claim 1, wherein the plurality of pixels are arranged within an elliptical region of the image plane.

8. The display device of claim 7, wherein the selective enablement includes selectively enabling light emitters based on whether light from the light emitters would fall within the elliptical region at a current mirror angle.

9. The display device of claim 1, wherein the selective enablement of light emitters includes selectively enabling a higher proportion of light emitters to achieve a higher resolution, and selectively enabling a lower proportion of light emitters to achieve a lower resolution.

10. The display device of claim 1, further comprising one or more fixed or switchable diffusers, each switchable diffuser configured to cause emitted light from a light emitter to be diffused to result in an enlarged pixel projected on the image plane.

11. The display device of claim 10, wherein the controller is configured to selectively switch the one or more switchable diffusers to selectively enlarge pixels in regions of pixels spaced with a relatively lower resolution.

12. The display device of claim 1, wherein the controller is configured to sweep the mirror in a sawtooth pattern so that the mirror is driven from a first extreme angular position to a second extreme angular position at a first speed, then reset from the second extreme angular position to the first extreme angular position at a second speed exceeding the first speed.

13. The display device of claim 1, wherein the array of light emitters includes a column of red light emitters, a column of green light emitters, and a column of blue light emitters.

14. A method of controlling an array of light emitters and a mirror configured to reflect light from the light emitters towards an image plane, the method comprising:
sweeping the mirror through a range of angles,
selectively enabling one or more of the light emitters, such selective enablement configured to cause emitted light from the light emitters to project a plurality of pixels on the image plane, the plurality of pixels spaced with a non-uniform resolution; and
controlling one or more switchable diffusers, each switchable diffuser configured to cause emitted light from a light emitter to be diffracted to result in an enlarged pixel projected on the image plane.

15. The method of claim 14, wherein controlling the one or more switchable diffusers includes switching the one or more switchable diffusers to selectively enlarge pixels in regions of pixels spaced with a relatively lower resolution.

16. The method of claim 14, wherein:
the array of light emitters includes two or more columns with light emitters arranged with a spacing within each column defined by a pitch value;
the light emitters within a first column are arranged at an offset relative to the light emitters within a second column, the offset defined by an offset value less than the pitch value; and
the mirror is swept to display a vertical slice of pixels including pixels projected from light generated by emitters that were selectively enabled in the first column and the second column, wherein the offset arrangement of the first column and the second column increases an effective resolution of pixels within the vertical slice.

17. The method of claim 14, further comprising:
tracking an eye of a human viewer; and
based on a tracked pose of the eye of the human viewer, displaying the plurality of pixels with a non-uniform resolution including a foveal region having a higher resolution and a periphery region having a lower resolution.

18. A display device, comprising:
an array of light emitters;
a mirror configured to reflect light from the light emitters towards an image plane;
one or more switchable diffusers, each switchable diffuser configured to cause emitted light from a light emitter to be diffracted to result in an enlarged pixel projected on the image plane; and
a controller configured to control the array of light emitters and the mirror to:
sweep the mirror through a range of angles,
selectively enable one or more of the light emitters, such selective enablement configured to cause emitted light from the light emitters to project a plurality of pixels on the image plane, the plurality of pixels spaced with a non-uniform resolution, and
selectively switch the one or more switchable diffusers to selectively enlarge pixels in regions of pixels spaced with a relatively lower resolution.

19. The display device of claim 14, wherein:
the array of light emitters includes two or more columns of light emitters with light emitters in each column arranged with a spacing defined by a pitch value; and
the light emitters within a first column are arranged at an offset relative to the light emitters within a second column, the offset defined by an offset value less than the pitch value.

20. The display device of claim 19, wherein the offset value is less than half the pitch value.

* * * * *